C. G. TAYLOR.
BEED CORN TESTER.
APPLICATION FILED APR. 17, 1908.

No. 899,000.

Patented Sept. 15, 1908.

Witnesses
Hugh H. Ott

Inventor
Clarence G. Taylor
By Victor J. Evans
Attorney

UNITED STATES PATENT OFFICE.

CLARENCE G. TAYLOR, OF SIBLEY, IOWA.

SEED-CORN TESTER.

No. 899,000.　　　　Specification of Letters Patent.　　Patented Sept. 15, 1908.

Application filed April 17, 1908. Serial No. 427,747.

*To all whom it may concern:*

Be it known that I, CLARENCE G. TAYLOR, a citizen of the United States of America, residing at Sibley, in the county of Osceola and State of Iowa, have invented new and useful Improvements in Seed-Corn Testers, of which the following is a specification.

This invention relates to seed corn testers, and one of the principal objects of the same is to provide a simple, true and efficient seed box in which there are a number of seed openings separated one from the other and indicated by a number, character or figure so that a kernel of corn planted in one of the openings may be identified with the ear from which the kernel is taken by numbering the ear correspondingly to the opening.

Another object of the invention is to provide a tester box in which the conditions for germination will be practically uniform from the center to the edges of the box so that each kernel will have an equal chance to show its germinating power.

It has been found in practice that near the edges of seed tester boxes the soil is warmer than at the center of the box, and hence the conditions for germination are somewhat enhanced at this point as compared to the center or other portions of the box. I have found that by using a concaved bottom for the box so that the soil is deeper at the edges than at the center, the seed corn will germinate equally at all points.

Another object of the invention is to provide a tester box in which the seed will germinate under conditions closely resembling those to which it is liable in the field, and in such a way that the seed may be examined after the plant is developed.

A close following of field conditions has to my knowledge never before been attempted in seed corn testers that permitted examination of seed after the plant was developed. I find that with a tester constructed according to the following description this desirable resemblance is secured without interfering with the later examination of the seed.

The objects and advantages hereinbefore referred to may be attained by means of the construction illustrated in the accompanying drawing, in which,—

Figure 1:
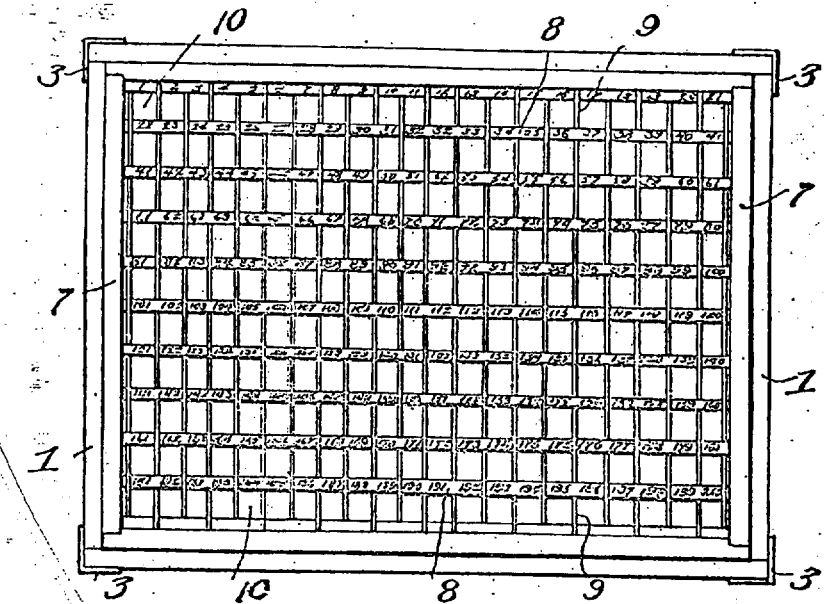
Figure 2:
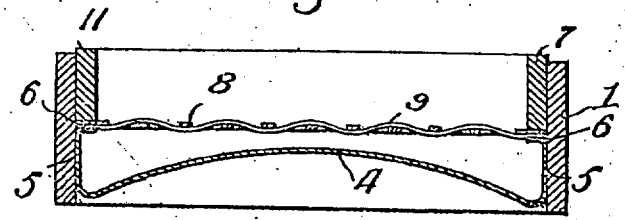
Figure 3:
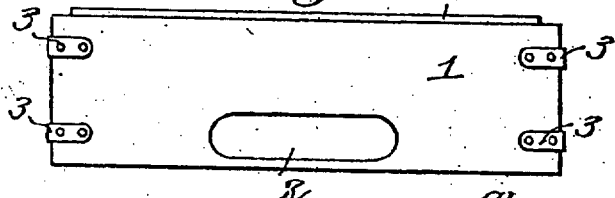

Figure 1 is a plan view of a seed corn tester made in accordance with my invention. Fig. 2 is a transverse vertical section of the same. Fig. 3 is an end view.

Referring to the drawing for a more specific description of my invention, the numeral 1 designates the outer box or casing which may be conveniently made of wood, certain of the sides or ends thereof being provided each with an air hole 2 which also facilitates handling the box. This box may be provided with corner fastenings 3 to properly hold the parts in place. Secured within the box 1 is a metal bottom, preferably of galvanized iron, said bottom having a concaved central portion 4, upturned sides 5 and an inturned marginal flange 6. This bottom is secured within the box 1 with the convex portion upward and the flanges 6 extending inward to form a support for the removable tester member.

The tester member comprises a rectangular frame 7 of a size to fit nicely within the box 1, said member having a bottom composed of cross bars 8 and interwoven strips 9 of wood or metal, said bottom forming a foraminous diaphragm provided with a series of openings 10 which are numbered consecutively from one to any suitable number. In the present instance the box shows 200 openings, each of a size sufficient to give room for several kernels of corn. This tester member, as shown in Figs. 2 and 3, extends slightly above the box 1, as at 11, and the bottom of the box 1 is secured slightly above the lower edge of said box, the result of which construction is that one box may be placed on top of the other and held firmly in place by means of the projecting portions 11 fitting within the bottom of the next box, so that a series of boxes may be used and packed away in tiers.

The operation of my invention may be briefly described as follows: The tester member is first removed from the box, and soil is placed within the box upon the bottom and properly moistened and gotten into condition for germination of the seed. The tester member is then placed in position on top of the soil with the soil slightly protruding through the openings 10. The kernels are then withdrawn one at a time from the ears and planted in the openings 10, the ears of corn being labeled similarly to the openings in order that they may be later identified. When the desired number of kernels are planted the tester member is filled with soil to a depth of two or three inches and the whole kept at a germinating temperature. When it is desired to determine the vitality of the various kernels this may be done by removing the tester member and examining the plants rooted in the bottom soil.

From the foregoing it will be obvious that my invention is of simple, compact construction, gives an equal chance to each kernel to germinate under uniform soil conditions, owing to the different depths of the soil at the center and sides of the tester, and is easy to manage and has been found efficient in use. By the removal of the tester member with the covering soil the plants are neatly exposed for inspection.

Having thus described the invention, what is claimed as new, is:—

1. A seed corn tester comprising an outer box having a bottom which extends upwardly as it recedes from the sides and approaches the center of the box, supporting devices at the sides of said box at a point higher than the highest portion of the bottom and a tester member fitted within the outer box, supported by such supporting devices and provided with a bottom having seed openings.

2. A seed tester comprising an outer case or box having a concavo-convex bottom secured thereto, said box being provided with air holes, a tester member comprising a frame fitted within the box and provided with a bottom formed by interwoven strips, said bottom providing seed openings each numbered for identification, the tester member projecting above the box and the concaved bottom being secured within the box at a slight distance above the lower edge, for the purpose described.

3. A seed corn tester comprising an outer box or casing having a concaved bottom and inwardly extending marginal flanges, said box being provided with air holes, a tester member provided with interwoven strips at the bottom thereof to form a bottom having seed openings therein, each numbered for identification, said tester member being removable and lifting the covering soil from the plants, and said tester member projecting above the box and concaved bottom secured at a slight distance above the lower edge, for the purpose described.

In testimony whereof I affix my signature in presence of two witnesses.

CLARENCE G. TAYLOR.

Witnesses:
J. F. MATTERTT,
E. C. UPP.